UNITED STATES PATENT OFFICE.

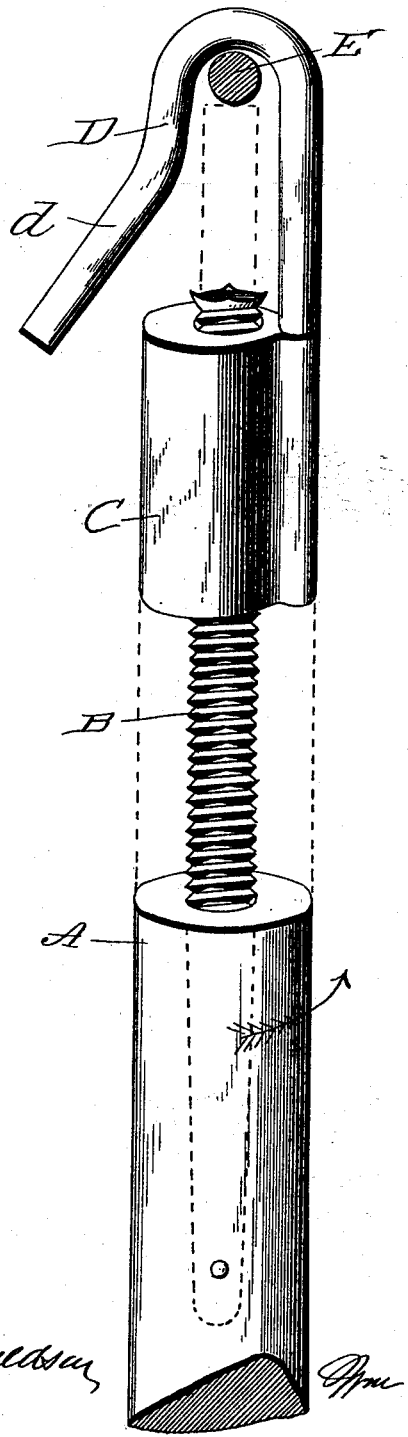

WILLIAM C. APPLEGATE, OF SHARON, PENNSYLVANIA.

LINE-PROP.

SPECIFICATION forming part of Letters Patent No. 518,479, dated April 17, 1894.

Application filed August 18, 1893. Serial No. 483,431. (No model.)

*To all whom it may concern:*

Be it known that I, WILLIAM C. APPLEGATE, a citizen of the United States of America, residing at Sharon, in the county of Mercer and State of Pennsylvania, have invented certain new and useful Improvements in Line-Props, of which the following is a specification.

My invention relates to improvements in props for clothes lines, guy ropes and the like, and the object of the invention is to provide a prop or support which, after it has been placed in position to support the line, can be securely attached thereto to prevent accidental displacement.

The invention is illustrated in the accompanying drawing in which the figure represents the upper end of a prop constructed in accordance with my invention, the full lines showing the prop as it appears with the parts in position ready to be applied to a line, and the dotted lines showing the parts adjusted to prevent accidental displacement.

In the drawing A represents a portion of the upper end of a pole or prop of the ordinary or any desired form which is provided with a screw threaded extension B rigidly connected thereto. A collar C, screw threaded to correspond with the screw threaded extension B, is mounted upon the said extension and is provided with a hook portion D, extending from the upper end thereof upon one side. This hook portion is designed to be hooked over the line, and in order to assist the user in securing it to the line the outer end of the hook as at $d$, is inclined away from the collar so that it may be more readily hooked over the line. When the parts are in the relative position shown in full lines in the figure the hook can be readily placed over the line which will rise to the top of the hook and occupy the position shown at E, and while it is in this position the rotation of the pole in the direction of the arrow will cause the screw threaded extension to be screwed up into the collar until it occupies the position shown by dotted lines. It will be readily seen that the collar will be prevented from turning as the pole is revolved by reason of the engagement of the hook with the line passing through the same. The space between the sides of the hook near the upper end is formed of a width but slightly exceeding the diameter of the end of the screw threaded extension and thus when the said extension assumes the position shown in dotted lines the rope will be confined to a practically inclosed space and it cannot be removed from this space until the pole is again revolved to unscrew the extension from the collar and withdraw its upper end from the space between the sides of the hook.

Having thus described my invention, what I claim is—

In combination with a pole having a screw threaded extension upon its end, a screw threaded collar movable on said extension, and a hook projecting from the upper portion of said collar with the space between its opposing sides adapted to be closed by said extension when it is screwed through the collar, substantially as described.

In testimony whereof I affix my signature in presence of two witnesses.

WILLIAM C. APPLEGATE.

Witnesses:
A. W. WILLIAMS,
CHARLES KAUFMAN.